US012747764B2

(12) United States Patent
Cividini et al.

(10) Patent No.: US 12,747,764 B2
(45) Date of Patent: Sep. 29, 2026

(54) DISC BRAKE PAD AND METHOD FOR THE MANUFACTURING THEREOF

(71) Applicant: Brembo S.p.A., Curno (IT)

(72) Inventors: Omar Cividini, Curno (IT); Fabio Giacometti, Curno (IT)

(73) Assignee: Brembo S.p.A., Curno (IT)

( * ) Notice: Subject to any disclaimer, the term of this patent is extended or adjusted under 35 U.S.C. 154(b) by 529 days.

(21) Appl. No.: 18/256,315

(22) PCT Filed: Dec. 9, 2021

(86) PCT No.: PCT/IB2021/061493

§ 371 (c)(1),
(2) Date: Jun. 7, 2023

(87) PCT Pub. No.: WO2022/123476

PCT Pub. Date: Jun. 16, 2022

(65) Prior Publication Data

US 2024/0052897 A1 Feb. 15, 2024

(30) Foreign Application Priority Data

Dec. 10, 2020 (IT) ........................ 102020000030353

(51) Int. Cl.
*F16D 65/092* (2006.01)
*C04B 35/573* (2006.01)
(Continued)

(52) U.S. Cl.
CPC .......... *F16D 65/092* (2013.01); *C04B 35/573* (2013.01); *C04B 35/83* (2013.01); *F16D 69/023* (2013.01); *C04B 2235/428* (2013.01)

(58) Field of Classification Search
CPC ....... F16D 2069/001; F16D 2200/0047; F16D 65/092; F16D 69/023; C04B 35/83;
(Continued)

(56) References Cited

U.S. PATENT DOCUMENTS 6,042,935 A 3/2000 Krenkel et al.
6,221,475 B1 * 4/2001 Domergue ............ C04B 35/573 523/156

FOREIGN PATENT DOCUMENTS

CN 103511525 A 1/2014
WO 03080540 A2 10/2003

OTHER PUBLICATIONS

European Patent No. EP 0482210 to Idesawa published on Oct. 31, 1991.*

(Continued)

*Primary Examiner* — Pamela Rodriguez
(74) *Attorney, Agent, or Firm* — Marshall & Melhorn, LLC

(57) ABSTRACT

A pad for disc brakes, a method for the manufacturing thereof, and a braking system with the pad are disclosed. The pad for disc brakes has a thickness (y) and a first surface cooperating with an actuator of a disc brake. The pad also has a second tribologically active friction surface that cooperates with the disc of the disc brake. The pad also has a first portion and a second portion, where the first portion of the pad extends for a thickness ($y_1$) from the first surface, and the second portion of the pad extends for a thickness ($y_2$) from the second tribologically active friction surface. The first surface and the first portion of the pad are made of carboceramic material, while the second surface and the second portion of the pad are made of carbonaceous material (C/C).

22 Claims, 1 Drawing Sheet

(51) Int. Cl.
*C04B 35/83* (2006.01)
*F16D 69/02* (2006.01)

(58) Field of Classification Search
CPC . C04B 35/573; C04B 2235/428; C04B 35/80; C04B 2235/483; C04B 2237/365; C04B 2237/385; B32B 18/00
See application file for complete search history.

(56) References Cited

OTHER PUBLICATIONS

Chinese Patent No. CN 110606763 to Shi et al published on Dec. 24, 2019.*
Chinese Patent No. CN 112377547 to Zhu et al published on Feb. 19, 2021.*
WO document No. WO 2023/237976 to Cividini et al published on Dec. 14, 2023.*
European Patent Office, International Search Report and Written Opinion in Application No. PCT/IB2021/061493, dated Mar. 21, 2022, 14 pages, Rijswijk, Netherlands.

* cited by examiner

DISC BRAKE PAD AND METHOD FOR THE MANUFACTURING THEREOF

FIELD

The present invention relates to a disc brake pad, a method for the manufacturing thereof, and a braking system comprising a disc and said pad.

BACKGROUND

The use of disc brake pads made of carbon-based materials, called "Carbon-Carbon" or "C/C", is known. These are composite materials consisting of reinforcing carbon fibers within a carbonaceous matrix. Said pads are adapted to collaborate with a disc brake disc which is also made of "C/C" material.

Such pads are obtained through a process which involves the superimposition of layers or sheets of two- or three-dimensional fabric or the use of short fibers to form a carbonaceous preform, possibly the addition of resins, possibly subsequent heat treatments, and carbon densification processes. The latter can be performed, for example, by CVD (Chemical Vapor Deposition), CVI (Chemical Vapor Infiltration), LPI (Liquid Polymer Infiltration), PIP (Polymer Infiltration and Pyrolysis), or pitch impregnation, all of which lead to a density increase able to confer adequate mechanical, thermal and tribological properties to the material, e.g. a density increase of 2 to 6 times.

To work as friction material, the "C/C" material needs high application temperatures which make pads entirely made of "C/C" material particularly suitable for applications in disc brakes intended to be installed on high-performance vehicles, e.g., high-end cars or racing motorcycles.

However, said pads made of "C/C" material have a limited stiffness due to the residual porosity of the material.

It is known that having brake pads for braking systems with adequate structural stiffness is a very important requirement to avoid damage to the braking system and to prevent conveying the feel of a spongy braking system to the driver, resulting in extra travel of the lever or pedal of the braking system itself or the inability to apply the full travel of the lever or pedal necessary to brake the vehicle safely. This need is particularly felt in the vehicles belonging to the highest performance segments and for the most extreme braking applications, such as in sports cars and motorcycles.

Attempts have been made to increase the structural stiffness of "C/C" pads for disc brakes, but none have proven to be satisfactory.

A first suggested solution involves the deposition of additional carbon on the pads through an additional stage of CVD ("chemical vapor deposition") to further reduce the level of residual porosity and to increase the density of the pads themselves. However, the density growth in a CVD process is asymptotic and, as the porosity level of the pads decreases, the carbon only deposits on the surface, limiting the actual gain in stiffness. Furthermore, this process is very expensive.

Another known solution involves inserting a support plate made of a stiffer material, e.g., ceramic or metal, and associating it with the "C/C" material of the pad which defines the tribologically active part of the pad capable of collaborating with the disc of the braking system. The plate is connected to the "C/C" material by gluing or by mechanical fasteners, e.g., such as screws or rivets. The plate substantially performs the function of mechanical support for the "C/C" material, it is adapted to withstand the compression and bending stresses which occur during the use of the brake, and cooperates with the actuators (hydraulic pistons) of the braking system to allow the movement of the pad.

However, the presence of a plate made of ceramic material, and even more so of metallic material, in the pad contributes to a significant increase in the weight of the pad itself, and the use of a lightened support plate would not guarantee adequate mechanical resistance to the pad. Furthermore, the manner of fixing the plate to the "C/C" material—by gluing and/or by mechanical fasteners—leads to a limited increase in the stiffness of the pad; indeed, the glue is a "soft" element which decreases the stiffness, while the screws or rivets can generate clearances which contribute to decreasing the stiffness of the pad as well. Finally, this solution can expose the braking system to the risk of sudden failure; since they connect two different materials, the glue and the mechanical fasteners represent the weak point of the system.

Instead, CN103511525 and WO 03/080540 describe disc brake pads made entirely of carboceramic material starting from "C/C" material. However, since the pads described in this prior art are no longer made of "C/C" material, they no longer have the advantageous characteristics associated with these materials, such as lightness and high mechanical strength, which make them particularly suitable for high-end street-legal applications and adapted to cooperate with discs also made of "C/C" material. Furthermore, they lead to variations of friction and performance which are no longer in line with what is expected from "C/C" materials.

Therefore, to date, it has not been possible to significantly increase the stiffness of disc brake pads while maintaining unaltered the optimal characteristics of the "C/C" material.

Thus, the problem underlying the present invention is to provide a disc brake pad which overcomes the drawbacks of the prior art and maintains high performance characteristics even in extreme applications, and to provide a process for obtaining said pad which is convenient to implement. More specifically, the present invention aims at increasing the stiffness of the pads made of "C/C" material, hence the stiffness of the braking system, at the same time without excessively increasing the initial weight, modifying the braking action of the pads themselves, or obtaining undesirable effects, including failures of the braking system.

SUMMARY

The problem set forth above is solved by a pad for disc brakes, a method for the manufacturing of said pad, and a braking system comprising the aforesaid pad, as outlined in the appended claims, the definitions of which form an integral part of the present description.

A first object of the invention is a pad for disc brakes, said pad having a thickness y and comprising:

- a first surface intended to cooperate with actuating means of a disc brake,
- a second tribologically active friction surface, opposite to said first surface, intended to cooperate with the disc of a disc brake,
- a first portion of the pad and a second portion of the pad, wherein
- said first portion of the pad extends for a thickness equal to $y_1$ starting from said first surface within said pad, and
- said second portion of the pad extends for a thickness equal to $y_2$ starting from said second tribologically active friction surface within said pad,
- said pad being characterized in that:

said first surface and said first portion of the pad are made of a carboceramic material comprising carbon and silicon carbide, and said second tribologically active friction surface and said second portion of the pad are made of a carbon-based material named "Carbon-Carbon" or "C/C".

A further object of the present invention is a method for the manufacturing of the pad as defined above, which comprises the following steps:

a) preparing a pad made of "C/C" material comprising a first surface intended to cooperate with actuating means of a disc brake and a second tribologically active friction surface intended to cooperate with the disc of a disc brake, said pad having a thickness equal to y;

b) contacting the pad obtained in step a) with silicon so that at least part of the silicon infiltrates said pad for a thickness equal to $y_1$ starting from said first surface, said thickness $y_1$ being less than the thickness y of the pad;

c) subjecting the pad obtained in step b) to dry and/or wet finishing.

Another object of the present invention is a braking system for disc brakes comprising a disc and a pad as defined above intended to cooperate with said disc. Said disc is advantageously made of "C/C" material.

The pad object of the present invention advantageously shows an increased structural stiffness, hence an increased compressive strength, without exhibiting a significant increase in weight. Indeed, it has been surprisingly found that the pad of the present invention shows an optimal weight-to-stiffness ratio. At the same time, the pad object of the present invention is able to provide the performances in terms of friction coefficient that are characteristic of "C/C" materials.

Furthermore, the pad object of the invention, which is monobloc, shows a gradual transition between carboceramic material and "C/C" material, thus minimizing the risks of failure of the braking system to which, instead, pads comprising a support plate and an associated friction material are exposed, as mentioned above. Therefore, the pad object of the invention is provided with high compactness and cohesion between the two portions.

Further features and advantages of the invention will be apparent from the description of some illustrative embodiments, given here by way of non-limiting example.

DETAILED DESCRIPTION

It is an object of the present invention to provide a disc brake pad comprising a first surface intended to cooperate with actuating means of a disc brake and a second surface intended to cooperate with the disc of a disc brake, wherein the first surface and a portion of the pad extending for a given thickness from said first surface are made of a carboceramic material comprising carbon and silicon carbide, while the second surface and a portion of the pad which extends for a given thickness from said second surface are made of a "C/C" carbonaceous material.

Surprisingly, it has been found that the portion delimited by the first surface of the pad (named first portion) acts as a mechanical support for the carbonaceous material "C/C" of the portion delimited by the second surface (named second portion) which defines the tribologically active part of the pad, increasing the stiffness and the compressive strength of the pad itself and making the use of external ceramic or metal plates unnecessary, thus avoiding all the disadvantages associated therewith. Additionally, said second portion advantageously maintains the performances in terms of friction coefficient that are characteristic of "C/C" materials, which make it suitable to collaborate with a disc also made of carbonaceous material.

Furthermore, by virtue of the increased stiffness of the pad of the present invention, it has been surprisingly found that it is possible to increase the number of the ventilation openings and, therefore, the heat exchange, of the pad. Also by virtue of a better heat dissipation, the pad according to the present invention is suitable for use in braking systems of sport and high-performance cars.

Figure 1:
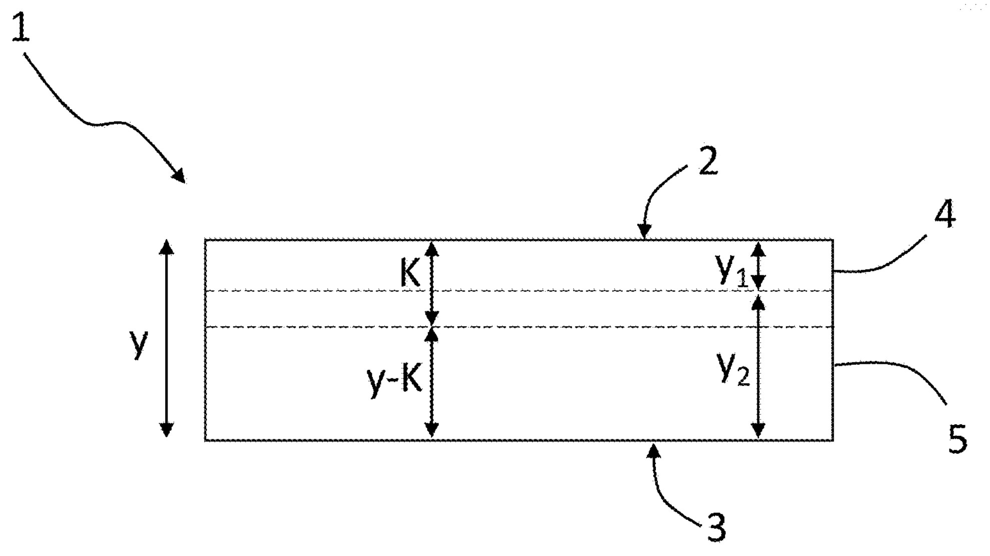
FIG. 1 diagrammatically shows a section view of a disc brake pad according to an embodiment of the invention.

A cross-section of the pad object of the present invention is shown in FIG. 1, merely by way of example.

The pad 1 shown in FIG. 1 comprises a first surface 2 intended to cooperate with actuating means of a disc brake, in particular with the hydraulic pistons of the caliper (not shown) of a disc brake, and a second surface 3 intended to cooperate with the surface of a disc (not shown) of a disc brake.

The pad 1 has a thickness y and is divided into two portions along the transverse axis of the pad itself. In particular, said pad 1 is divided into a first portion 4 and a second portion 5.

Said first portion 4 is delimited by the surface 2 of the pad and extends inside the pad for a thickness equal to $y_1$. Said first portion 4 is made of a carboceramic material comprising carbon and silicon carbide.

Said second portion 5 is delimited by the surface 3 of the pad and extends inside the pad for a thickness equal to $y_2$. Said second portion 5 is made of a carbonaceous material "C/C".

Preferably, said first portion 4 and said second portion 5 extend across the entire surface area of the pad. In other words, the surface 2 of the pad intended to cooperate with actuating means of a disc brake coincides with the surface of the first portion of the pad, and the surface 3 of the pad intended to cooperate with the disc of a disc brake coincides with the surface of the second portion of the pad.

The second surface 3 of the pad, thus the second portion 5 of the pad as well, are subject to wear. The thickness $y_1$ of the first portion 4 of the pad is function of the "minimum worn out thickness K" admissible for a specific pad. The expression "minimum worn out thickness K" denotes the minimum admissible thickness of a worn out pad, i.e., worn due to friction of the second surface 3 against the disc of a disc brake. In other words, the thickness of the pad which is worn out, namely consumed, over time corresponds to the dimension (y−K). The thickness $y_1$ of the first portion 4 of the pad is advantageously less than said thickness K ($y_1<K$) and the thickness $y_2$ of the second portion 5 of the pad is advantageously always greater than zero ($y_2>0$) even after wear of the pad.

The thickness $y_1$ of said first portion of the pad is comprised preferably between 5% and 90%, between 5% and 70%, between 7% and 50%, between 10% and 30%, of the thickness y of said pad.

The thickness $y_2$ of the second portion of the pad is comprised preferably between 10% and 95%, between 30% and 95%, between 60% and 90%, between 75% and 85%, more preferably is at least 70% or at least 80%, of the thickness y of said pad.

In a preferred embodiment, said first surface and said first portion of the pad, which are made of carboceramic material, comprise silicon, carbon, and silicon carbide.

Preferably, said first surface and said first portion of the pad have a composition, expressed as weight percentages, which varies in the ranges shown below:

carbon fibers 20-70%, preferably about 30-50%
carbon matrix 20-70%, preferably about 30-50%
silicon 0-10%, preferably about 0-5%
SiC 10-40%, preferably 15-25%.

According to an embodiment, said first surface contains a higher weight percentage amount of silicon carbide (SiC) and, optionally, of silicon than that contained in the first portion of the pad.

According to an embodiment, said first portion of the pad contains a greater percentage amount by weight of silicon carbide (SiC) and, optionally, of silicon near the first surface and a gradually decreasing amount thereof as one moves away from said first surface.

In a preferred embodiment, said second portion of the pad, which is made of "C/C" material, has a composition, expressed as percentages by weight, which may vary in the ranges shown below:

carbon fibers 25-75%, preferably 40-60%
carbon matrix 25-75%, preferably 40-60%.

Said first surface and said first portion of the pad, which are made of carboceramic material, have a porosity preferably lower than 3%, more preferably lower than 2%, even more preferably lower than 1%.

Said first surface and said first portion of the pad, which are made of carboceramic material, have a density preferably comprised between 1.6 g/cm$^3$ and 2.3 g/cm$^3$, more preferably comprised between 1.7 g/cm$^3$ and 2.2 g/cm$^3$, even more preferably comprised between 1.8 g/cm$^3$ and 1.9 g/cm$^3$.

Such porosity and density values confer the appropriate stiffness characteristics to the carboceramic material of the first surface and of the first portion of the pad so that they can work as mechanical support for the second surface and the second portion of the pad. Advantageously, the pad according to the present invention does not comprise a support plate, e.g., made of a ceramic or metallic material.

The second tribologically active friction surface and the second portion of the pad have a porosity preferably comprised between 5% and 20%, more preferably comprised between 5% and 10%, and a density preferably comprised between 1.5 g/cm$^3$ and 1.9 g/cm$^3$, more preferably comprised between 1.6 g/cm$^3$ and 1.8 g/cm$^3$, able to impart lightness to the pad.

The pad object of the present invention has surprisingly exhibited an optimal weight-to-stiffness ratio.

In a first embodiment of the invention, the sum of the thickness $y_1$ of said first portion and the thickness $y_2$ of said second portion coincides with the thickness y of the pad.

In a further embodiment, said pad comprises a layer of material intermediate between said first portion and said second portion which possesses characteristics intermediate between the carboceramic material of the first portion and the "C/C" material of the second portion.

Preferably, said layer of material comprises carbon fibers, a carbon matrix, silicon carbide and, optionally, silicon. Preferably, said layer of material comprises silicon and silicon carbide in an amount lower than that contained in the first portion of the pad, preferably comprises silicon in an amount by weight lower than 5% and/or silicon carbide in an amount by weight lower than 10%.

The pad according to the present invention is obtained by a method according to the claims.

In a preferred embodiment, the step a) of the aforesaid method regarding the manufacturing of a pad made of "C/C" material comprises the following steps:

a1) preparing a preform of carbon-densified "C/C" material; and
a2) molding the preform obtained in step a1) into a mold for disc brake pads.

In a preferred embodiment, the aforesaid step a1) comprises the following steps:

i) printing layers of resin-impregnated two-dimensional fabric to form a preform model;
ii) optionally, printing short fibers impregnated with resin to form a preform model;
iii) optionally, printing short fibers mixed with resins, said resins being liquid or in powder form, to form a preform model;
iv) optionally, needling the aforesaid layers of fabric stacked to form an entangled three-dimensional structure;
v) optionally, needling the aforesaid short fibers to form an entangled three-dimensional structure;
vi) optionally, pyrolyzing the preform model obtained in one of the steps i), ii) or iii);
vii) optionally, impregnating with resins and/or pitches the preform model obtained in one of the steps iv) or v);
viii) optionally, subjecting the preform model obtained in one of the steps i), ii), iii), iv), v), vi) or vii) to a thermal pretreatment;
ix) subjecting the preform model obtained in one of the steps i), ii), iii), iv), v), vi), vii), or viii) to a carbon densification process until obtaining a material density greater than 1.5 g/cm$^3$, preferably greater than 1.7 g/cm$^3$;
x) optionally, subjecting the preform model obtained in step v) to a heat treatment.

In a preferred embodiment, the fabric used in step i) is a carbon fiber fabric.

The needling of step iv) can be conducted using conventional methods, which involve the use of appropriate needles which engage part of the fibers directing them axially to the pad and allowing three-dimensional structures to be obtained.

The resins of steps i), ii), iii) and vii) are selected, for example, from the group consisting of phenolic resins, acrylic resins, polystyrene, furan resins, or cyanoesters.

According to different embodiments, the carbon-densification process according to step ix) is conducted by means of different methods.

A first method is CVD (Chemical Vapor Deposition) or CVI (Chemical Vapor Infiltration), depending on whether only a coating or an infiltration of carbon in vapor form is desired. Typically, if the material is fibrous and thus has a high porosity, this method is referred to as Chemical Vapor Infiltration (CVI). These methods involve the use of hydrocarbon mixtures (e.g., methane and propane) and the exposure of the material to be treated to such mixtures at high temperatures and low pressures. The operating temperatures are in the range of 900-1200° C., preferably 1000-1100° C., and pressures lower than 300 mbar are used, preferably of a few tens of mbar. The hydrocarbon mixtures decompose to form elemental carbon, which is then deposited or infiltrated into the matrix of the material being treated. This method, which requires the use of dedicated furnaces, involves the deposition of a thin layer (typically a few microns) on the fibers; therefore, several cycles of infiltration and overall coatings on the fibers higher than ten microns (typically 10-20 microns) are required in order to obtain the desired densification.

A different method, known as LPI (Liquid Polymer Infiltration) or PIP (Polymer Infiltration and Pyrolysis) involves the infiltration of the matrix of the material to be treated with a liquid polymer and the subsequent high-temperature heat treatment (pyrolysis) which causes the carbonization of the polymer deposited on the carbon fibers. Also in this case, several steps of infiltration and pyrolysis are required before appropriate densification of the preform is achieved.

Regardless of the method used for the step ix) of carbon densification, the density of the material of the preform is typically greater than 1.5 g/cm$^3$.

In a preferred embodiment, the step a2) of molding the preform obtained during the previous step a1) is performed by operating at a temperature comprised between 80° C. and 200° C., preferably between 120° C. and 180° C. Preferably, said step a2) of molding is performed by operating at a pressure comprised between 25 and 300 bar, more preferably between 35 and 150 bar.

During step b), the pad is contacted with silicon so that at least part of the silicon infiltrates the pad for a thickness equal to $y_1$ starting from the first surface intended to cooperate with actuating means of a disc brake.

Advantageously, at least said first surface of the pad is contacted with silicon. Advantageously, the second surface of the pad is not contacted with silicon.

According to a first embodiment, said step b) comprises the following steps:

b1) arranging the pad obtained in step a) on a layer comprising silicon on the side of said first surface;

b2) subjecting the pad arranged on said layer comprising silicon to a temperature so that at least part of the silicon infiltrates by capillarity into the pad for said thickness equal to $y_1$ starting from said first surface.

According to a second embodiment, said step b) comprises the following steps:

b1) immersing the pad obtained in step a) in a bath comprising a silicone resin for a thickness substantially equal to $y_1$ starting from said first surface, said thickness substantially equal to $y_1$ being less than the thickness y of the pad;

b2) subjecting the pad partially immersed in said bath to a temperature such that said pad is impregnated with at least part of said silicone resin to a thickness equal to $y_1$ starting from said first surface.

First Embodiment (Layer Comprising Silicon)

In a first embodiment, said layer comprises solid silicon. Said layer may comprise one or more materials in addition to solid silicon, e.g. boron carbide ($B_4C$). According to this embodiment, the boron carbide is present in the aforesaid layer in a percentage by weight preferably comprised between 5% and 50%, more preferably comprised between 5% and 20%.

In a second embodiment, said layer consists of solid silicon.

According to different embodiments, the solid silicon is in pure form or in the form of silicon/aluminum or silicon/copper alloy and is in granules or powder form.

Hereafter, the term "silicon layer" is used both with reference to a layer comprising solid silicon and with reference to a layer consisting of solid silicon.

In an embodiment, during step b1) said pad is deposited directly on the silicon layer. The term "directly" refers to the fact that said pad is in contact with the silicon layer and there are no additional means or elements interposed between the pad and the silicon layer.

In a further embodiment, during step b1) said pad is deposited on the silicon layer through external means or elements, e.g. porous partitions, such as felts, pyrolyzed wood elements, or pegs. According to this embodiment, during step b1) the pad is not in contact with the silicon comprised in the layer. According to this embodiment, the pad will come into contact with the silicon during the step b2) of infiltration.

The step b2) of infiltration with silicon is conducted in an appropriate treatment chamber, provided with vents for the gases that are released during the treatment.

Said step b2) of infiltration advantageously comprises a liquid silicon infiltration (LSI) process, during which the silicon layer is subjected to a temperature above the melting temperature of the silicon, such that the silicon melts and infiltrates by capillarity into said pad for a thickness equal to $y_1$, as defined above.

According to this embodiment, the treatment chamber is introduced into a conventional type furnace, which is heated to a temperature preferably above 1410° C., more preferably comprised between 1420° C. and 1700° C., e.g. at about 1500° C. At these temperatures, the silicon melts and infiltrates the pores of the pad surface which is in contact with the silicon and reacts with part of the carbon of the carbon fibers and/or of the carbon matrix to form silicon carbide (SiC). Preferably, a portion of the molten silicon reacts with the carbon to give silicon carbide and a portion of the silicon remains unreacted. The unreacted silicon solidifies within the material of the pad during a step of cooling. Both the heating to the temperature of treatment and the successive cooling are conducted gradually. For example, it can take up to 8 or more hours to reach a temperature of treatment of about 1500° C. and a similar amount of time to cool the infiltrated pad.

Preferably, said step b2) of silicon infiltration is conducted at a reduced pressure comprised between 20 mbar and 150 mbar, more preferably between 80 mbar and 120 mbar.

Second Embodiment (Bath Comprising Silicone Resin)

As mentioned above, step b1) involves immersing the pad in a bath comprising a silicone resin for a thickness substantially equal to $y_1$ starting from said first surface.

The term "silicone resin" refers to an inorganic polymer based on a silicon—oxygen chain and organic functional groups bonded to the silicon atoms.

As mentioned above, step b2) comprises a process of impregnating the pad with the silicone resin.

Preferably, said process of impregnating the pad with the silicone resin is conducted at a temperature comprised between 750° C. and 1500° C., more preferably comprised between 800° C. and 900° C.

For example, said process of impregnating the pad with the silicone resin is conducted at atmospheric pressure.

Under these process conditions, the silicon in the form of a resin infiltrates the pores of the pad and reacts with part of the carbon of the silicone resin and/or with part of the carbon of the carbon fibers and/or with part of the carbon of the carbon matrix to form silicon carbide (SiC). Preferably, a portion of the silicon reacts with the carbon to give silicon carbide and a portion of the silicon remains unreacted.

The term "substantially equal to $y_1$" denotes a thickness such that at the end of step b2) the pad is impregnated with the silicone resin to a thickness equal to $y_1$.

The description below applies to both embodiments.

The amount of silicon with which the pad is contacted during step b) is preferably comprised between 3% and 60% by weight, between 3% and 50% by weight, between 3% and 40% by weight, between 5% and 20% by weight, between 5% and 15% by weight, relative to the total weight of the pad. Said amount refers, respectively, to the silicon present in the silicon layer as defined above (first embodiment) and to the silicon present in the silicone resin (second embodiment).

The amount of silicon with which the pad is contacted in step b) is that required to partially fill the porosity of the "C/C" material which constitutes the pad. In particular, said amount of silicon is the amount required to at least partially fill the porosity of the first surface, through which the pad is deposited on said silicon layer or immersed in said silicone resin bath, and of a first portion of the pad extending through said thickness $y_1$ starting from said first surface. In particular, said amount of silicon is such to fill neither the porosity of the second surface of the pad, opposite to said first surface, nor the porosity of a second portion of the pad extending for a thickness $y_2$ starting from said second surface.

Preferably, the silicon infiltration thickness $y_1$ is comprised between 5% and 90%, between 5% and 70%, between 7% and 50%, between 10% and 30%, of the thickness y of the pad.

Preferably, the thickness $y_2$ is comprised between 10% and 95%, between 30% and 95%, between 60% and 90%, between 75% and 85%, more preferably is at least 70% or at least 80%, of the thickness y of the pad.

Preferably, the amount of silicon with which the pad is contacted is the amount required to fill from 30% to 100% of the porosity of the "C/C" material which constitutes the first surface and the first portion of the pad having thickness $y_1$. Said first surface and said first portion of the pad having thickness $y_1$ thus result densified with the silicon carbide and optionally with the silicon, and the resulting porosity of said first surface and said first portion of the pad is preferably lower than 3%, more preferably lower than 2%, even more preferably lower than 1%.

In other words, the amount of silicon present in said layer or in said bath is less than that required to completely infiltrate the pad.

The process parameters described above with reference to step b2) (temperature and pressure) are such as to promote a partial ascent by capillarity (first embodiment) or a partial impregnation (second embodiment) of the silicon through the pad, in particular for a thickness equal to $y_1$ starting from the first surface of the pad. Said thickness $y_1$ of the pad results densified with the silicon carbide and optionally with the silicon, which close the porosity of the material which constitutes said thickness $y_1$ to values preferably lower than 3%, more preferably lower than 2%, even more preferably lower than 1%.

The thickness $y_1$ of silicon infiltration, and thus also the amount of silicon with which the pad is contacted in step b), depends on the final application of the pad and its degree of wear. For example, in a pad with an initial thickness of 25 mm (dimension y in FIG. 1), which reduces to 15 mm (dimension K in FIG. 1) with wear, the thickness $y_1$ of infiltration is less than 15 mm ($y_1 < K$). In this specific example, the thickness $y_1$ of silicon infiltration turns out to be less than 60% of the thickness y of the pad.

Said thickness $y_1$ of infiltration is monitored, for example, by analyzing a section of the pad by SEM microscopy.

Advantageously, the tribologically active friction surface of the pad intended to cooperate with the disc does not contain, or contains a negligible amount of, silicon carbide and optionally silicon. The term "negligible" denotes an amount of silicon carbide and, optionally, silicon which does not alter the coefficient of friction of the "C/C" material, preferably an amount less than 0.5%, more preferably less than 0.3%, even more preferably less than 0.1%, than the weight of the pad.

Advantageously, the second portion of the pad delimited by said tribologically active friction surface does not contain, or contains a negligible amount of, silicon carbide and optionally silicon. In this case, the term "negligible" denotes a quantity of silicon carbide and, optionally, silicon such that the tribologically active friction surface maintains its coefficient of friction unchanged even after wear of the pad and detachment from it of part of the "C/C" material with which this surface is made.

During the step c) of finishing, each surface deformation is removed from the two surfaces. Such a finishing treatment is preferably conducted dry, e.g., by diamond polishing.

The pad obtained according to the method of the present invention has demonstrated extremely advantageous properties.

Example

A pad made of "C/C" material having an initial thickness of 20 mm and an initial weight of about 250 g was subjected to the method according to the present invention.

In particular, said pad made of "C/C" material was deposited on a layer consisting of solid silicon. The starting dose of solid silicon is 7.5% by weight relative to the weight of the pad.

Said pad was then subjected to a stage of LSI (Liquid Silicon Infiltration), conducted at a maximum temperature of 1500° C. and a pressure of 100 mbar.

Compared to the pad made of "C/C" material, the pad resulting from the above method of partial infiltration exhibited a stiffness increase of 75% and a weight increase of 6%. The increase in stiffness more than compensated for the increase in pad weight, so the pad exhibits an optimal weight-to-stiffness ratio.

Figure 2:
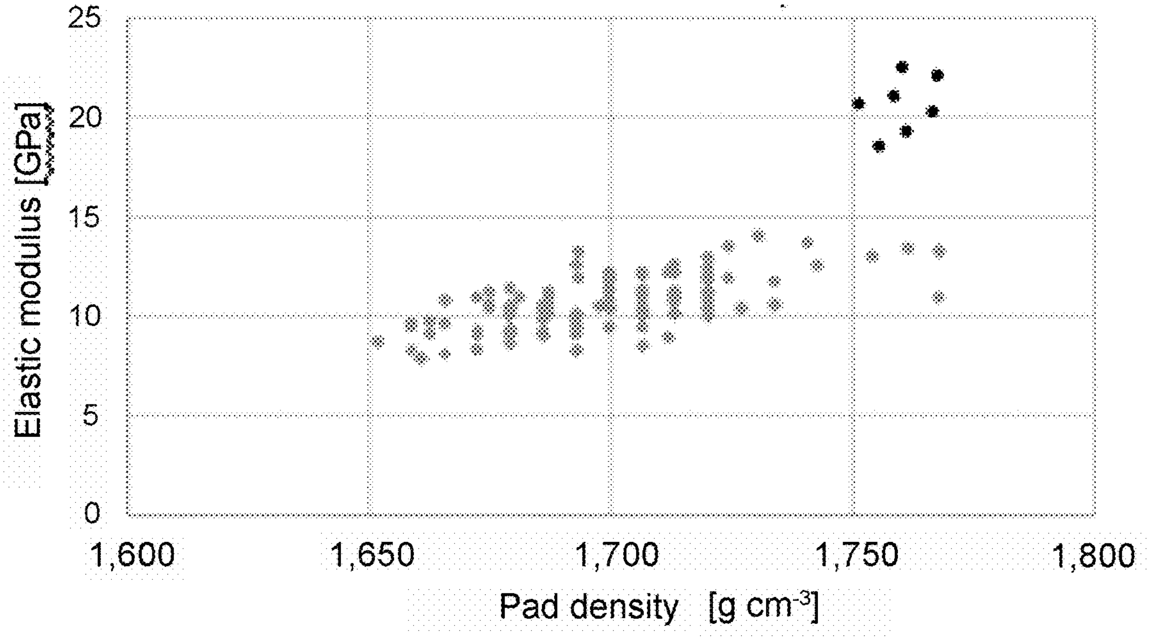
FIG. 2 shows a chart displaying the elastic modulus vs. the density of the pad object of the present invention (dark dots) and of a pad made entirely of "C/C" material (light dots).

The chart in FIG. 2 shows that the pad according to the present invention exhibits an elastic modulus, hence stiffness, which are much higher than the pad made of "C/C" material.

It is clear that what has been described is just a particular embodiment of the present invention. The person skilled in the art will be able to bring any necessary modifications both to the pad and the method for obtaining it in order to adapt them to particular conditions, without however departing from the scope of protection as defined in the attached claims.

The invention claimed is:

1. A pad for disc brakes, having a thickness (y) and comprising:

a first surface intended to cooperate with actuating means of a disc brake, a second tribologically active friction surface, opposite to said first surface, intended to cooperate with a disc of a disc brake, a first portion of the pad and a second portion of the pad, wherein said first portion of the pad extends for a thickness (y1) starting from said first surface within said pad, and said second portion of the pad extends for a thickness (y2) starting from said second tribologically active friction surface within said pad, said pad being characterized in that:

said first surface and said first portion of the pad are made of a carboceramic material comprising carbon and silicon carbide, and said second tribologically active friction surface and said second portion of the pad are made of a carbon-based material named "Carbon-Carbon" or "C/C", wherein said first surface and said first portion of the pad have a composition by weight which varies within the following ranges:

carbon fibers 20-70% carbon matrix 20-70% silicon 0-10%

SiC 10-40%.

2. The pad according to claim 1, wherein said first portion of the pad and said second portion of the pad extend across the entire surface area of said pad.

3. The pad according to claim 1, wherein said first surface and said first portion of the pad have a composition by weight which varies within the following ranges:

carbon fibers 30-50% carbon matrix 30-50% silicon 0-5%

SiC 15-25%.

4. The pad according to claim 1, wherein said first surface and said first portion of the pad have a porosity lower than 3% or lower than 2%, or lower than 1%, and/or a density comprised between 1.6 g/cm3 and 2.3 g/cm3 or between 1.7 g/cm3 and 2.2 g/cm3, or between 1.8 g/cm3 and 1.9 g/cm3.

5. The pad according to claim 1, wherein said second surface and said second portion of the pad have a composition by weight which varies within the following ranges:

carbon fibers 25-75% carbon matrix 25-75%.

6. The pad according to claim 1, wherein said second surface and said second portion of the pad have a porosity comprised between 5% and 20%, or between 5% and 10%, and/or a density comprised between 1.5 g/cm3 and 1.9 g/cm3, or between 1.6 g/cm3 and 1.8 g/cm3.

7. The pad according to claim 1, wherein the thickness (y1) of said first portion of the pad is comprised between 5% and 90%, or between 5% and 70%, or between 7% and 50%, or between 10% and 30%, of the thickness (y) of said pad.

8. The pad according to claim 1, wherein the thickness (y2) of said second portion of the pad is comprised between 10% and 95%, or between 30% and 95%, or between 60% and 90%, or between 75% and 85% of the thickness (y) of said pad.

9. A braking system for disc brakes comprising the disc and the pad according to claim 1, said disc being made of "C/C" material and said pad being intended to cooperate with said disc.

10. A method for manufacturing a pad for disc brakes comprising the following steps:

a) preparing the pad made of "C/C" material comprising a first surface intended to cooperate with an actuating means of a disc brake and a second surface intended to cooperate with a disc of the disc brake, said pad having a thickness equal to (y);

b) contacting the pad obtained in step a) with silicon so that at least part of the silicon infiltrates said pad for a thickness equal to (y1) starting from said first surface, said thickness (y1) being less than the thickness (y) of the pad;

c) subjecting the pad obtained in step b) to dry and/or wet finishing, wherein during said step b), the second surface of the pad intended to cooperate with the disc of the disc brake and a pad portion extending for a thickness (y2) starting from said second surface are not infiltrated with the silicon.

11. The method according to claim 10, wherein said thickness (y1) of silicon infiltration is comprised between 5% and 90%, or between 5% and 70%, or between 7% and 50%, or between 10% and 30%, of the thickness (y) of the pad.

12. The method according to claim 10, wherein said thickness (y2) is comprised between 10% and 95%, or between 30% and 95%, or between 60% and 90%, or between 75% and 85% of the thickness (y) of said pad.

13. The method according to claim 10, wherein step a) of preparing the pad made of "C/C" material comprises the following steps:

a1) preparing a preform of carbon-densified "C/C" material; and a2) molding the preform obtained in step a1) into a mold for disc brake pads.

14. The method according to claim 10, wherein the silicon with which the pad is contacted during step b) is in an amount between 3% and 60% by weight, or between 3% and 50% by weight, or between 3% and 40% by weight, or between 5% and 20% by weight, or between 5% and 15% by weight, relative to the weight of the pad.

15. The method according to claim 10, wherein said step b) comprises the following steps:

b1) arranging the pad obtained in step a) on a layer comprising silicon on the side of said first surface;

b2) subjecting the pad arranged on said layer comprising silicon to a temperature so that at least part of the silicon infiltrates by capillarity into the pad for said thickness equal to (y1) starting from said first surface.

16. The method according to claim 15, wherein the layer on which the pad is deposited during step b1) contains solid silicon.

17. The method according to claim 15, wherein step b2) comprises a liquid silicon infiltration (LSI) process conducted at a temperature above 1410° C., and/or at a pressure comprised between 20 mbar and 150 mbar.

18. The method according to claim 17, wherein step b2) comprises a liquid silicon infiltration (LSI) process conducted at a temperature comprised between 1420° C. and 1700° C., and/or at a pressure comprised between 80 mbar and 120 mbar.

19. The method according to claim 10, wherein said step b) comprises the following steps:

b1) immersing the pad obtained in step a) in a bath comprising a silicone resin for a thickness substantially equal to (y1) starting from said first surface, said thickness substantially equal to (y1) being less than the thickness (y) of the pad;

b2) subjecting the pad partially immersed in said bath to a temperature such that said pad is impregnated with at least part of said silicone resin to a thickness equal to (y1) starting from said first surface.

20. The method according to claim 19, wherein step b2) comprises a process of impregnating the pad with the resin, said process being conducted at a temperature comprised between 750° C. and 1500° C.

21. The method according to claim 20, wherein the process of impregnating the pad with the resin is conducted at a temperature comprised between 800° C. and 900° C.

22. A pad for disc brakes as obtainable by the method according to claim 10.

* * * * *